(12) United States Patent
McElligott (10) Patent No.: US 11,365,060 B2
(45) Date of Patent: Jun. 21, 2022

(54) CONVEYOR MODULE, ASSEMBLY, SYSTEM, AND CONTROL

(71) Applicant: Michael C. McElligott, Hope Island (AU)

(72) Inventor: Michael C. McElligott, Hope Island (AU)

(*) Notice: Subject to any disclaimer, the term of this patent is extended or adjusted under 35 U.S.C. 154(b) by 140 days.

(21) Appl. No.: 16/644,477

(22) PCT Filed: Sep. 3, 2018

(86) PCT No.: PCT/AU2018/000165
§ 371 (c)(1),
(2) Date: Mar. 4, 2020

(87) PCT Pub. No.: WO2019/046879
PCT Pub. Date: Mar. 14, 2019

(65) Prior Publication Data
US 2020/0283230 A1  Sep. 10, 2020

(30) Foreign Application Priority Data

Sep. 5, 2017 (AU) .................................. 2017903578

(51) Int. Cl.
*B65G 23/10* (2006.01)
*B65G 1/04* (2006.01)
(Continued)

(52) U.S. Cl.
CPC ............ *B65G 23/10* (2013.01); *B65G 1/0492* (2013.01); *B65G 15/12* (2013.01); *B65G 15/22* (2013.01);
(Continued)

(58) Field of Classification Search
CPC ...... B65G 1/026; B65G 1/0492; B65G 15/12; B65G 15/22; B65G 21/00; B65G 21/22;
(Continued)

(56) References Cited

U.S. PATENT DOCUMENTS 6,422,382 B1 * 7/2002 Ertel ...................... B65G 21/02
198/841
7,275,635 B2 * 10/2007 Enya ...................... B65G 37/02
198/463.2

(Continued)

FOREIGN PATENT DOCUMENTS

EP 1184306 A2 3/2002
EP 1604921 A1 12/2005

*Primary Examiner* — Gene O Crawford
*Assistant Examiner* — Keith R Campbell
(74) *Attorney, Agent, or Firm* — Craft Chu PLLC; Andrew W. Chu (57) ABSTRACT

A conveyor module includes an elongate frame to which a looped conveyor track is mounted. The frame includes first and second end housings which include end pulleys for the conveyor track. The frame also includes a drive housing located at a mid-portion thereof which houses the drive motor for the conveyor track. The conveyor module is a discrete independently driven unit with an upper portion (running surface) of the conveyor track in a planar orientation for conveying items thereon in use. The conveyor module can include additional smart features. A warehouse floor arrangement uses a plurality of side by side conveyor modules being identical and grouped into banks.

15 Claims, 3 Drawing Sheets

(51) Int. Cl.

| | |
|---|---|
| *B65G 15/12* | (2006.01) |
| *B65G 15/22* | (2006.01) |
| *B65G 21/00* | (2006.01) |
| *B65G 23/04* | (2006.01) |
| *B65G 23/44* | (2006.01) |

(52) U.S. Cl.
CPC ............ *B65G 21/00* (2013.01); *B65G 23/04* (2013.01); *B65G 23/44* (2013.01); *B65G 2203/0208* (2013.01); *B65G 2203/042* (2013.01); *B65G 2203/044* (2013.01); *B65G 2203/045* (2013.01); *B65G 2207/30* (2013.01)

(58) Field of Classification Search
CPC ........ B65G 23/04; B65G 23/10; B65G 23/44; B65G 2203/0208; B65G 2203/0216; B65G 2203/042; B65G 2203/044; B65G 2203/045; B65G 2207/30

See application file for complete search history.

(56) References Cited

U.S. PATENT DOCUMENTS

| | | | |
|---|---|---|---|
| 7,383,944 B2* | 6/2008 | Hall | B65G 21/00 198/816 |
| 8,936,147 B2* | 1/2015 | Knas | B65G 23/44 198/814 |
| 2007/0295583 A1 | 12/2007 | Bude et al. | |
| 2010/0133069 A1* | 6/2010 | Senn | B65G 43/08 198/583 |
| 2013/0264176 A1 | 10/2013 | Ertel et al. | |
| 2015/0360869 A1 | 12/2015 | Bastian et al. | |
| 2016/0347548 A1* | 12/2016 | Yamaji | B65G 15/00 |

\* cited by examiner

CONVEYOR MODULE, ASSEMBLY, SYSTEM, AND CONTROL

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a conveyor module, assembly, system, and control.

2. Description of Related Art Including Information Disclosed Under 37 CFR 1.97 and 37 CFR 1.98

Conveyor systems are typically used to move a variety of items in many different industries. These conveyor systems have different designs which could employ rollers, flat fibre belts, linked modular belts and even chains that moves items placed on the running surface of the conveyor. In most systems, these conveyors have a single direction flow, although most are capable of being bi-directional.

The conveyor systems typically consist of multiple segments to create longer runs of conveyor to get from one location to another. Typically, the width of the conveyor system is based on the largest possible product that needs to be transported in the given facility.

Therefore, whenever the conveyor system is transporting anything smaller than the maximum size, it is inefficient in terms of being under-utilised across the width of the system.

The present invention seeks to overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

BRIEF SUMMARY OF THE INVENTION

According to a first aspect, the present invention provides a conveyor module comprising an elongate frame having side edges,
a conveyor track mounted to the frame, wherein lateral edges of the conveyor track extend to adjacent the side edges of the frame, and
drive means for driving the conveyor track along the frame, wherein lateral surfaces of the drive means are substantially aligned with the side edges of the frame.

In one embodiment, the conveyor module is 200 mm to 400 mm in width.

In another embodiment, the conveyor module is 3000 mm to 10000 mm in length.

In another embodiment, the frame comprises spaced side rails which define the side edges of the frame.

In another embodiment, the side rails are shaped to have channels for low friction wear pads onto which the conveyor track travels.

In another embodiment, the conveyor track comprises segments extending between the side rails, the segments being joined in series to form a conveyor loop.

In another embodiment, the drive means comprises first and second end housings mounted to respective ends of the frame, the end housings comprising tension pulleys for the conveyor track.

In another embodiment, the drive means comprises a drive housing located at a mid-portion of the frame which houses a drive motor for the conveyor track.

In another embodiment, the drive means comprises a first end housing mounted to a first end of the frame having tension pulleys for the conveyor track and a drive housing located at a second end of the frame which houses a drive motor for the conveyor track.

In another embodiment, the drive means comprises housing which extends past the side edges of the frame by a maximum of 30 mm.

In another embodiment, the drive means comprises housing which is flush with a running surface of the conveyor track.

In another embodiment, the drive means comprises housing which extends downwardly from a running surface of the conveyor track by a maximum of 300 mm.

In another embodiment, the conveyor module comprises a product scanner disposed in each end housing, each scanner being directed upwardly through a window in an upper wall of the end housing.

In another embodiment, the conveyor module comprises memory means for storing information on goods stored thereon scanned by the product scanner.

In another embodiment, the conveyor module comprises local communication (LC) means for communicating with at least one adjacent conveyor module.

In another embodiment, the LC means comprises an infrared transmitter/receiver directed outwardly via apertures in the end housings, which allows the conveyor module to communicate with another conveyor module disposed adjacent therewith.

In another embodiment, the LC means allows the conveyor module to communicate with another conveyor module disposed side-by-side and/or end-to-end therewith.

In another embodiment, the conveyor module comprises remote communication (RC) means adapted for the conveyor module to communicate with a central control for providing information to or receiving information from the central control.

In another embodiment, the conveyor module comprises at least one of a temperature sensor, humidity sensor, and a load sensor.

In another aspect, the present invention provides a conveyor assembly comprising:
- a plurality of side by side conveyor modules, each conveyor module being an independently driven narrow conveyor,
- wherein two or more adjacent conveyor modules can be synchronised to work in unison to convey an item which substantially spans the width of the two or more conveyor modules.

In one embodiment, the conveyor modules are arranged in at least one bank and the conveyor modules are disposed parallel, side by side, and close to each other.

In another embodiment, first ends of the conveyor modules are aligned.

In another embodiment, banks of conveyor modules are separated by an access path.

In another embodiment, the access path includes carriage tracks for a goods shuttle.

In another embodiment, the goods shuttle comprises a plurality of side by side conveyor modules, each conveyor module being an independently driven narrow conveyor.

In another embodiment, the assembly is arranged in multiple levels.

In another embodiment, the banks are arranged in an end-to-end manner.

In another embodiment, the conveyor modules are adapted such that conveyor tracks thereof can be disposed side-by-side and closely adjacent each other.

In another embodiment, the conveyor modules are in accordance with any one the above.

In another embodiment, each conveyor module comprises a product scanner and memory means for storing information on goods stored thereon scanned by the product scanner.

In another embodiment, each conveyor module comprises local communication (LC) means for communicating with at least one adjacent conveyor module.

In another embodiment, each conveyor module comprises remote communication (RC) means adapted for the conveyor module to communicate with a central control for providing information to or receiving information from the central control.

In another embodiment, each conveyor module comprises at least one of a temperature sensor, humidity sensor, and a load sensor for communicating data at the location of the conveyor module to the central control.

Other aspects of the invention are also disclosed.

BRIEF DESCRIPTION OF THE SEVERAL VIEWS OF THE DRAWINGS

Notwithstanding any other forms which may fall within the scope of the present invention, preferred embodiments of the present invention will now be described, by way of examples only, with reference to the accompanying drawings.

FIG. 2 shows (a) schematic side-sectional view and (b) cross-sectional view of the track portion of the conveyor module of FIG. 1.

DETAILED DESCRIPTION OF THE INVENTION

It should be noted in the following description that like or the same reference numerals in different embodiments denote the same or similar features.

Conveyor Module

Figure 1:
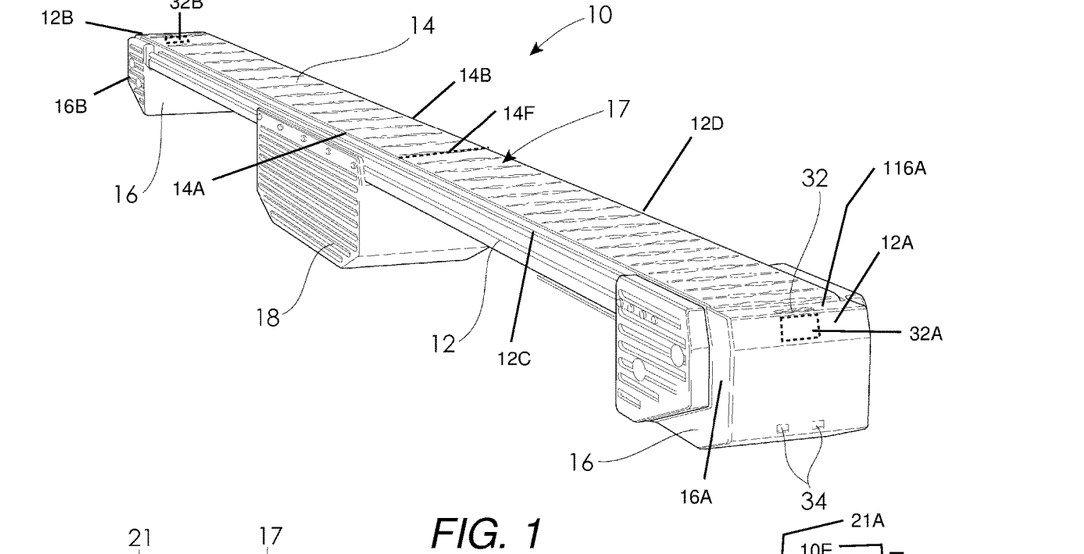
FIG. 1 shows a front perspective view of an independently driven narrow conveyor module according to a preferred embodiment of the present invention.
Figure 2A:
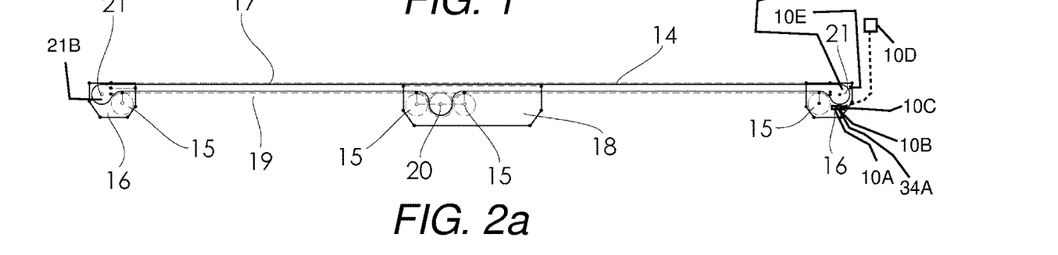
Figure 2B:
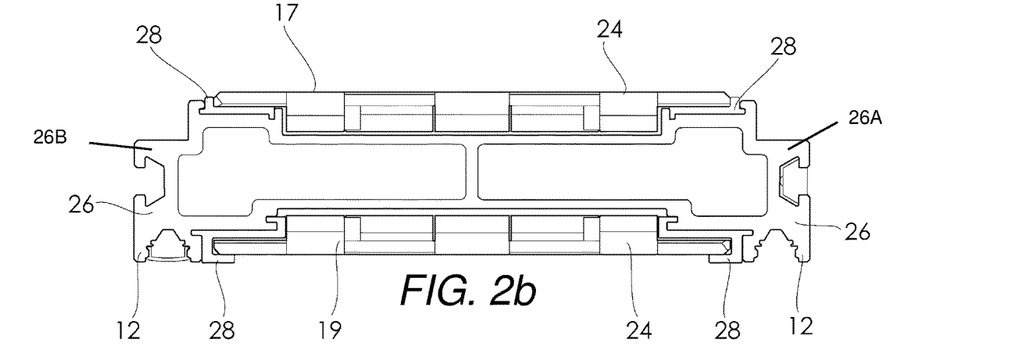

FIGS. 1 and 2 shows a conveyor module 10 according to a preferred embodiment of the present invention. The conveyor module 10 comprises an elongate frame 12 to which a looped conveyor track 14 (having lateral edges 14A and width 14B) is mounted. The frame 12 (having first end 12A, second end 12B, first side edge 12C, second side edge 12D) includes joined spaced side rails 26 (first side rail 26A, second side rail 26B) which are shaped to have upper and lower channels for receiving low friction wear pads 28. The conveyor track 14 comprises segments 24 extending between the side rails 26. The segments 24 are joined in series to form the loop, and move along the low friction pads 28.

The frame 12 comprises first and second end housings 16 (first end housing 16A, second end housing 16B) which in the embodiment are identical. The end housings 16 include end pulleys 21 (first tension pulley 21A, second tension pulley 21B) for the conveyor track 14. The frame 12 also comprises a drive housing 18 located at a mid-portion thereof which houses the drive motor 20 for the conveyor track 14. Support idler rollers 15 are provided to support the conveyor track 14 against the end pulleys 21 and the drive motor 20.

The conveyor module 10 is thus a discrete independently driven unit with an upper portion (running surface) 17 of the conveyor track 14 in a planar orientation for conveying items thereon in use. A lower portion (return) 19 of the conveyor track 14 extends under the upper portion 17.

The conveyor module 10 is narrow, being about 300 mm wide in the embodiment. In a preferred embodiment, the conveyor module 10 is 5000 mm long. The conveyor module 10 is however not limited to these dimensions. The frame 12, the end housings 16 and the drive housing 18, have a profile to maintain the narrow dimensions of the conveyor 12. For example, the end housings 12 and the drive housing 18 only extend past the side edges of the conveyor track 14 by a small amount, and the end housings 12 only extend past the end portions of the conveyor track 14 also by a small amount. The dimensions of the conveyor track 14 in the embodiment extends substantially close to the length and width of the conveyor module 10.

The conveyor module 10 further comprises additional smart features.

This includes a product scanner (32A, 32B) disposed in each end housing 16 (first end housing 16A, second end housing 16B). Each scanner is directed upwardly through a window 32 in an upper wall 116A of the first end housing 16A adjacent the respective end portions of the conveyor track 14. The scanners (first product scanner 32A, second product scanner 32B) are thus positioned to scan products as they are loaded to and unloaded from the conveyor module 10.

Each conveyor module 10 further comprises communication means, including local communication (LC) means 10B and remote communication (RC) means 10C.

Local Communication (LC) means 10B are adapted for each conveyor module 10 to communicate and coordinate with an adjacent other conveyor or conveyor modules 10 or a goods conveyor shuttle as further described below. Such LC means can include an infrared transmitter/receiver 34A directed outwardly via apertures 34 in the front wall of the end housings 16, which allows a conveyor module 10 to communicate with another conveyor module 10, 10F disposed inline (end-to-end) therewith. Other local communication means are also possible such as Bluetooth.

Remote Communication (RC) means 10C are adapted for each conveyor module 10 to communicate with a central control 10D for providing information to, or receiving information from, the central control. Such RC means can include Bluetooth, Wi-Fi, or other wireless means.

Wired communication can also be used for both LC and RC means 10B 10C but is less preferred.

Each conveyor module 10 further comprises a number of sensors 10E such as a temperature sensor, humidity sensor, and a load sensor. The sensors are connected to the central control via the RC means for the purposes described below.

Each independently driven narrow conveyor module can also include a localised electronic package that include one or more of the following: Processors, Sensors, Feedback Devices, Onboard Memory, Back up Battery, Hardwired or wireless connection with a Master Database, Motor Drives, and Motor. If provided with basic operating parameters, these independently driven narrow conveyor modules 10 working in collective teams can make decisions onboard to operate fully independent of the system that oversees the master database and the complete installation.

The Module design is compact in width for creating the minimal width between belt modules. The conveyor module has confined the electronics, and the motor drive assembly to coincide to substantially the same width occupied by the conveyor belt. Also in the vertical footprint of the design, idler pulleys have been utilised to create a shorter vertical footprint that is approximately only 60 mm taller than the beam of a typical pallet rack. This maximises the storage capacity of every shelf height.

Conveyor Assembly

Figure 3A:
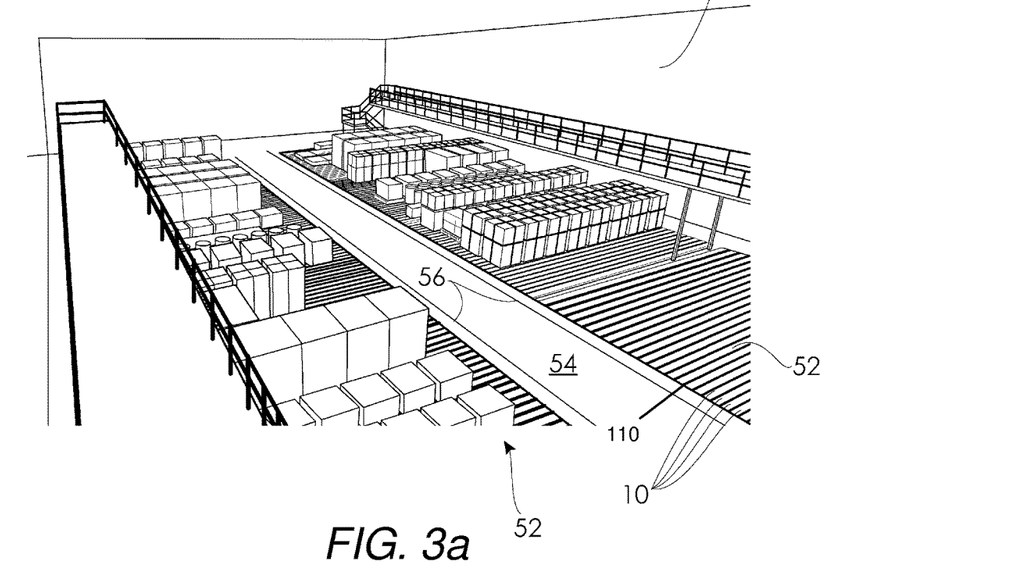
FIG. 3(a) shows a perspective view of an example warehouse floor arrangement using a plurality of side by side conveyor modules according to FIG. 1, and (b) is an enlarged sectional view of a section of (a).
Figure 3B:
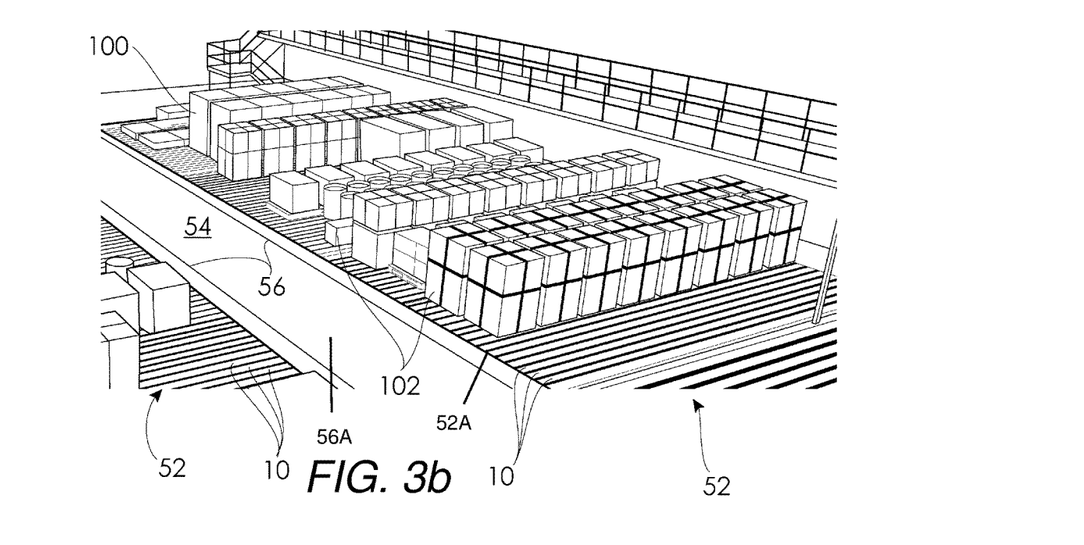
Figure 4:
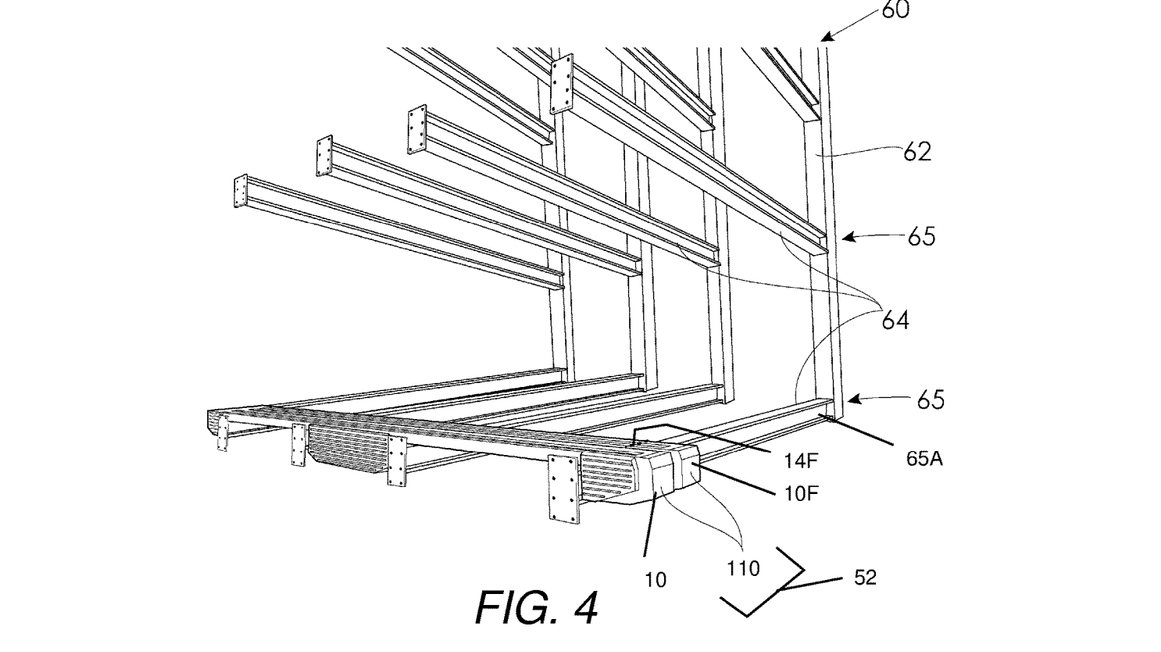
FIG. 4 illustratively shows a perspective view of an installation of side by side conveyor modules according to FIG. 1 to a pallet racking.

FIG. 3 shows an example of a warehouse floor arrangement 50 using a plurality of side by side conveyor modules 10 (10 and 10F in FIG. 4). The conveyor modules 10 in the example are identical and grouped into two banks 52, 52A with an access path 54 extending between the banks 52, 52A.

In each bank 52, the conveyor modules 10 are disposed parallel, side by side, and close to each other. The gaps between conveyor modules 10 are minimised such that the gaps between the conveyor tracks 14 are minimised. First ends of the conveyor modules 10 are aligned along the access path 54.

The access path 54 can be used for worker access with goods moving equipment or can include carriage tracks 56 for a goods shuttle 56A.

The conveyor modules 10 which work alone, or in conjunction with adjacent independently driven narrow conveyor modules 10 to work in unison to closely match the width of the product needing to be transported or stored.

The example shows a configuration with side-by-side independently driven narrow conveyor modules 10, 10F that are each 300 mm wide. Items 102 which are 850 mm wide to be transported or stored on the conveyor modules 10 requires three of the independently driven narrow conveyor modules 10 to synchronously work in unison to convey those items. Wider items 100 which spans eight to ten conveyor modules 10 in width (width 14C and respective width 14F of the adjacent conveyor module 10F) will require such conveyors to work in unison.

The remaining side-by-side conveyor modules 10 can then be configured to run in unison (and independent of the other rows already in use) to create additional rows of conveyor in any 300 mm increment until the maximum number of available rows of independently driven narrow conveyors are used.

Decentralised Operation and Communication

The conveyor modules 10 can also be arranged end-to-end to extend the effective length of each conveyor row. Each conveyor row thus comprises two or more conveyor modules 10 arranged end-to-end. The conveyor modules 10 in each row will be linked from the exit end of one section to the entry end of the following conveyor module 10 to communicate when the following conveyor module 10 should actuate as well as to communicate data of the products transferring from one unit to the next unit.

This communication is via the LC means and can be physically wired, wireless or visual communication link. The data being communicated can include the drive function of each conveyor unit letting them know when to start or stop, speed, etc.

Additionally, the assembly can include default criteria that would act as a set of instructions on how the conveyor modules behave. For instance, the conveyor modules 10 might be instructed to take any product being introduced to the line and move it as far forward as possible, and to not leave any empty sections or voids in the conveyor row. Alternatively, the assembly may require that the conveyor modules only travel the minimum distance to introduce a new stored item, then hold that position until the next item arrives and then only move enough to fit the new incoming item.

In end-to-end independently driven narrow conveyors rows, as the first section needs to send its first item across to the second independently driven narrow conveyor, it can communicate that this next section should get its motors and electrical systems ready to receive a product. Then the two sections can pass a set of commands letting each conveyor module know that a product will be sent from one module to the next. The communication in one embodiment can be via the infrared transmitter/receiver directed outwardly via apertures 34, which will be aligned in the end-to-end junctions between the conveyor modules 10.

On the entrance and exit of each conveyor module, there is a photo eye detection to monitor traffic passing each intersection of any two modules (the product scanner in each end housing 16 directed upwardly through window 32). Along with encoders that determine conveyor travel they can verify that the same product leaving one section matches the feedback of the receiving section.

Not only would the operational functions like start and stop be communicated front-to-back between adjoining sections, but this is also being communicated side-by-side for situations where several parallel independently driven narrow conveyors need to operate in unison to act as one. The conveyor modules 10 for example can include similar infrared transmitter/receivers directed via sideward apertures similar to 34, but located on both sides of end housing 16.

Multi-Level Storage Assembly

Figure 5:
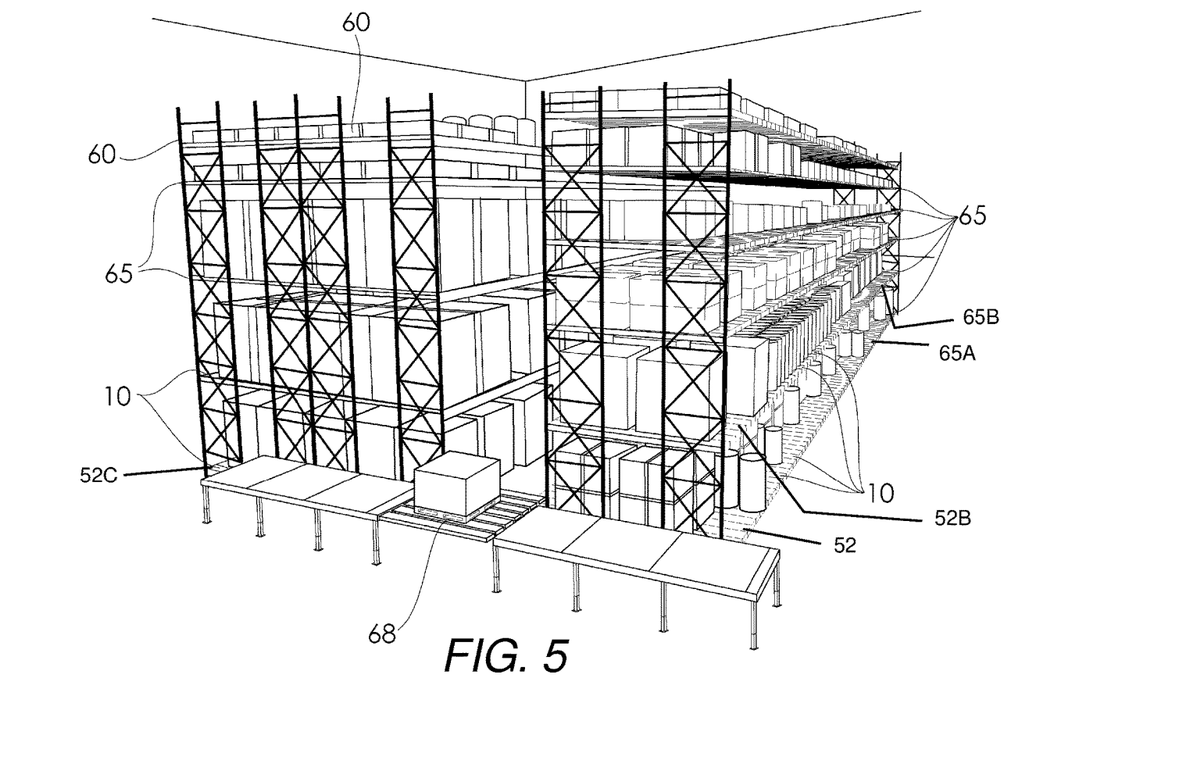
FIG. 5 shows a perspective view of an example warehouse vertical storage (pallet racking) arrangement using a plurality of side by side conveyor modules according to FIG. 1.

FIGS. 4 and 5 shows a racking assembly 60 for applying the present invention to a warehouse environment. The racking assembly 60 includes spaced vertical supports 62 to which lengths of horizontal beams 64 are mounted. The horizontal beams 64 are arranged to form levels 65 (one level 65A, another level 65B). The conveyor modules 10 are arranged across the lengths of the horizontal beams 64 to provide multi-level pallet shelving (another bank 52B on another level 65B).

The depths of the racking assembly can also be enhanced. Sets of pallet racks 60 can be built back to back, with the conveyor modules 10 being arranged end-to-end banks 52, 52C in the adjacent levels 65 (one level 65A, another level 65B). The conveyor modules 10 provide the ability to drive products deeper into the depths of each shelf 65, thus eliminating the need for many aisle ways between the pallet racks 60 for a forklift or pedestrian access.

For example, fourteen side-by-side independently driven narrow conveyors that are each 300 mm wide will make the face of each shelf 4200 mm wide. If the length of each conveyor is 5000 mm long, these could be bridged across two (or more) Pallet Rack Assemblies to support the loads. On typical warehouse installations, it would not be possible to have accessibility deeper than 2000 mm, and that is only possible with special forklift attachments. The example configuration would eliminate the need for one aisle way. However, because these are independently driven narrow conveyors, this entire structure could be repeated to make end-to-end depth of 10,000 mm, or tripled to go 15,000 mm without the need for aisle ways.

Furthermore, the assembly can be enhanced by varying the heights of different pallet racking bays (the shelves), to maximise the vertical limits of the building. By varying the shelf heights in a large warehouse, the independently driven narrow conveyor modules 10 can maximise the efficiency of filling the widths of each shelf by using only the minimal number of belt conveyor modules 10 to match the products dimensional width. By matching product height to a suitable shelf height, the vertical footprint can also be maximised to give full cubic utilisation of the X, Y and Z dimensions of a warehouse capacity.

The reference to Pallet Racking above is by way of example only and the invention can also be applicable to Multi-story buildings, or Mezzanines.

Fully Autonomous Operation

The preferred embodiment will provide an Automated Storage and Retrieval System (ASRS or AS/RS) which will include unique features provided by the independently driven narrow conveyor modules 10. With the conveyor assemblies, a typical installation can include conveyor assemblies being fixed stationary units, and other units will be floating on a floor mounted Shuttle Car or on Shuttle Cars with lifting function to travel both on a pathway (virtual or fixed) as well as travel up and down (elevator) to raised shelves or floors within a facility.

Adding Product Data to Decentralised Operation and Communication

The conveyor assemblies can communicate operational functions, verification of physical product characteristics such as width and length, and product unique identification. Additionally, product environmental criteria can be transmitted and tracked. The items being transported could be proactively monitored and positioned based on the requirements, and the ever-changing environmental conditions of the facility.

Each conveyor module has at least one, and possibly three, Microcontrollers. Each conveyor module will also be connected to a master server where the Server can exchange information to each and every conveyor module.

Various programmed modes will be provided that the conveyor modules can be configured to use. The modes are programmed directly on each conveyor module, and the server will send a one-off instruction to the conveyor module on what mode it wants it to operate in, until that mode needs to be switched to a different mode. Furthermore, the master server may send a signal to a series of conveyor modules to be on standby because a transfer to those sections is on its way. After those basic instructions are transferred it is up to the individual conveyor modules to wait for the arriving modules and confirm their preparedness for a transfer, then the transfer takes place, and once the belt module(s) has the products, it behaves in the mode that it was instructed to function. For example, if the mode was to take any incoming product, and transfer it as far down the pathway of available space, then that is what the conveyor belt, and each adjoining conveyor belt will do. It will share the progress of the movement of goods with the master server, but the master server is not driving that process. It's all being driven on board each module, and modules working collectively as a whole.

The data is stored on each module and then transferred to the next module, when the product moves from section to section. Once a product is moved off a section it lets the master server know it no longer has that item, and then clears that data from the onboard register.

Product Tracking for Redundancy of Inventory Tracking.

The conveyor modules 10 individually can store information on the stored products therein including one or more of a serial number, factory order number, dimensions of the product being moved, or an entire data file with embedded details (i.e. storage requirements), the pathway it may need to travel throughout the journey, and data that may be used downstream by other processes throughout that product's manufacturing lifecycle. By carrying this data along with the product, the conveyor modules 10 not only allow for decentralised decision making by individual, or ganged-together sections of Conveyor Modules, but it also enables a redundant location for this information to be stored. It is inevitable that a major installation would have one centralised database for storing and overseeing the entire operation of a warehouse or storage area within a facility. If that centralised database was to ever become corrupt or data destroyed however, the conveyor modules 10 would be able to rebuild the database based on their local storage within each Conveyor Module.

For example, an assembly can include several sections of end-to-end independently driven narrow conveyor modules 10 and as the example above noted how the operational handshake occurs for transferring items from Module to Module, this transfer could also include the data needing to be carried with each product. So, if a container containing item "XXX" passes the item to the next conveyor module, then the ownership of the location of item "XXX" also passes to that new conveyor module. This data can be shared with the centralised database as well so the data is secure in two independent systems (i.e. the Conveyor Module, and the Master Database).

In conventional floor conveyor system, the master server controls everything and stores all data. If the master server ever became corrupt and all data is lost, then once it is repaired, the entire contents of a warehouse would be unknown and users have the task of doing a physical inventory check to recreate the database.

In the present embodiments, a master snapshot of the entire structure of the warehouse is also stored in a single central database. However, if the database ever became corrupted and needed to be replaced, once the replacement master server is in place, the new empty drive could be populated with the data stored onboard each module to quickly rebuild the database of the entire warehouse.

The present embodiment conveyor modules are smart conveyors provided with onboard intelligence to know how they are moving something, what they are moving, and all starting and stopping functions are controlled onboard, based on the mode they are set to operate in.

Environmental Data Collection for Enhanced Functionality

The conveyor modules can include sensors for collecting environmental data of the area they are operating in with live results. Sensors can be provided at each end of the module for Temperature, Humidity, Light, as well other possible special applications such as the presence or absence of special gases, barometric pressure, etc.

Due to the design and automated functionality of the conveyor modules which work independently as well as collectively, having these sensors located throughout a facility gives an overall ability to create a 2D or 3D maps of those environmental values.

This is illustrated in the following several examples, to emphasise how the conveyor modules can respond. Below are some possible product items that can be used on the independently driven narrow conveyor modules 10, in a storage/warehouse application.

Item "A"—is a container of an item that has a limited shelf life of 72 hours.

Item "B"—is a container of an item that prematurely perishes in the presence of Methane gas.

Item "C"—is a container of an item that, unless is stored in an ideal environment, perishes and produces Methane gas.

Item "D"—is a container of an item that must be stored below 35 degrees Celsius.

Item "E"—is a product that cures best if stored in a relative humidity higher than 85% for the first six hours after manufacturing.

Assuming the data set that is passed along with each item when it is introduced to the warehouse, and assuming each conveyor module is equipped with a full range of environmental sensors, then the following could occur:

Item "A" gets time stamped as it enters the warehouse, and regardless of the number of item "A"s that are entered in, the retrieval system will take the oldest units first. Furthermore, the system could also automatically retrieve item "A"s that are over 72 hours old and deliver them to a waste section.

For another example, there is a section of the warehouse that contains both item "B" and "C". With the methane gas detectors picking up a higher than normal level in that same area, the system could retrieve the item "C" and relocate the containers to another area of the warehouse. If the Methane level increases in the new location then those items can again be relocated to another area for manual inspection. Alternatively, if moving item "C" does not reduce Methane levels in the area where Item "B" is still located then the system could try to relocate those items to a safer area, or notify personnel to inspect that area for alternative causes.

For a temperature related scenario, we can have Item "D" stored in an area of a warehouse, but depending on seasonal changes, or other cause that could affect a temperature shift in that area. If the sensors note the temperature is climbing towards 35 degrees, the system could be proactive and re-locate those items to a cooler section of the warehouse automatically and then track the temperature in that area to ensure a safe environment.

And lastly there can be a storage or manufacturing environment where the products entering the area are time-stamped and stored in special areas where the climate in controlled for a period of time, then those items can be relocated automatically when the preferred cooling or curing time has occurred.

The preferred embodiments thus provide:

An assembly comprising a plurality of individual narrow conveyor modules which can be configured to work in unison to create different width combinations, An assembly comprising individual narrow motorised conveyors placed on shelving to allow for deep and multiple position storage on shelving, The ability to add tracking and data information to items on a transport carrier, The ability to use peer to peer, or decentralised communications to share data and/or control function of a transport system.

Fully Autonomous Operation where there will be no user, or operator in sight. The system will effectively have a coordinate it needs to travel to, and then the moving component of the system (a conventional Shuttle Car, or a vertical travel Shuttle Car, or similar) will travel automatically to those coordinates and then the modules lined up with each other will transfer signals to begin transferring goods from one section to the next.

Whilst preferred embodiments of the present invention have been described, it will be apparent to skilled persons that modifications can be made to the above embodiments.

For example, the drive housing can be omitted and one of the end housings can be adapted to house the drive motor for the conveyor track.

I claim:

1. A conveyor module, comprising:
    an elongate frame having a first end, a second end opposite said first end, a first side edge extending between said first end and said second end, and a second side edge extending between said first end and said second end and being spaced opposite said first side edge;
    a first side rail along said first side edge;
    a second side rail along said second side edge;
    a conveyor track being looped, being mounted to the frame and extending between said first end and said second end, and having lateral edges adjacent said first side edge and said second side edge;
    drive means for said conveyor track along the frame, the drive means being comprised of a first end housing being mounted to said first end and being comprised of a first tension pulley connected to said conveyor track, and a second end housing being mounted to said second end and being comprised of a second tension pulley connected to said conveyor track;
    a first product scanner disposed in said first end housing;
    a second product scanner disposed in said second end housing; and
    memory means for storing information on goods stored on said conveyor track as scanned by at least one of said first product scanner and said second product scanner.

2. The conveyor module of claim 1 wherein said conveyor track has a width ranging from 200 mm to 400 mm, and wherein said lateral edges are disposed between said first side edge and said second side edge.

3. The conveyor module of claim 1, wherein said drive means is further comprised of a drive housing located at a mid-portion between said first end and said second end, said driving housing being comprised of a drive motor connected to said conveyor track.

4. The conveyor module of claim 3, wherein said drive housing is located at said second end of said elongate frame.

5. The conveyor module of claim 1 wherein said first end housing is comprised of an upper wall flush with said conveyor track, said first product scanner being directed upwardly though a window in said upper wall of said first end housing.

6. The conveyor module of claim 1, further comprising: local communication means for at least one adjacent conveyor module.

7. The conveyor module of claim 6, wherein the local communication means comprises an infrared transmitter/receiver directed outwardly via apertures in said first end housing so as to communicate with said at least one adjacent conveyor module.

8. The conveyor module of claim 1, further comprising: remote communication means for a central control so as to provide information to or receive information from said central control.

9. The conveyor module of claim 1, further comprising: at least one sensor being selected from a group consisting of: a temperature sensor, humidity sensor, and a load sensor.

10. A conveyor assembly, comprising:
a conveyor modules according to claim 1; and
at least one adjacent conveyor module being positioned side by side to said conveyor module, said conveyor module being independently driven relative to said at least one adjacent conveyor module,
wherein said conveyor module and said at least one adjacent conveyor module are synchronized so as to work in unison and so as to convey an item across said width of said conveyor modules and a respective width of said at least one adjacent conveyor module.

11. The conveyor assembly of claim 10, wherein said conveyor modules and said at least one adjacent conveyor module are arranged in at least one bank.

12. The conveyor assembly of claim 11, further comprising an adjacent bank, said at least one bank and said adjacent bank being separated by an access path, and
wherein said access path is comprised of carriage tracks so as to form a goods shuttle along said access path.

13. The conveyor assembly of claim 12, wherein each of the conveyor modules is independent.

14. The conveyor assembly of claim 11, further comprising another bank, wherein said at least one bank is on one level, and wherein said another bank is on another level.

15. The conveyor assembly of claim 11, further comprising an end to end bank, wherein said at least one bank and said end to end bank are arranged end-to-end.

* * * * *